March 23, 1965  G. HEERKLOTZ  3,174,416
MONOCULAR MIRROR REFLEX CAMERA
Filed May 4, 1961  2 Sheets-Sheet 1

Inventor
GUNTER HEERKLOTZ
By Irwin J. Thompson
Attorney

March 23, 1965  G. HEERKLOTZ  3,174,416
MONOCULAR MIRROR REFLEX CAMERA
Filed May 4, 1961  2 Sheets-Sheet 2
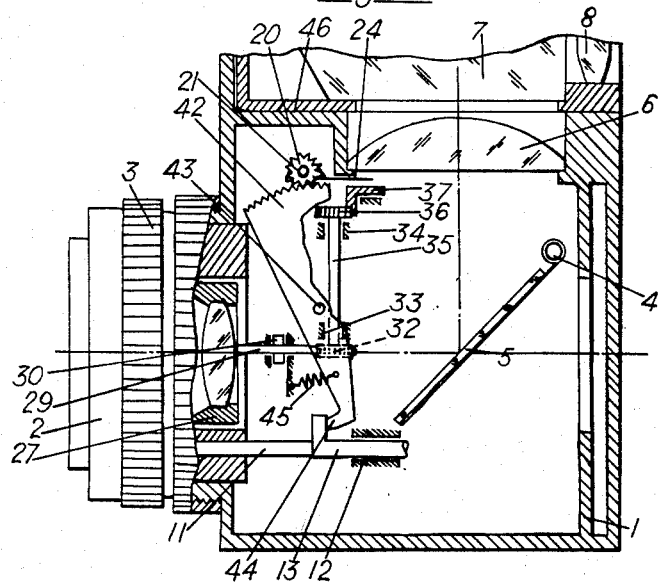
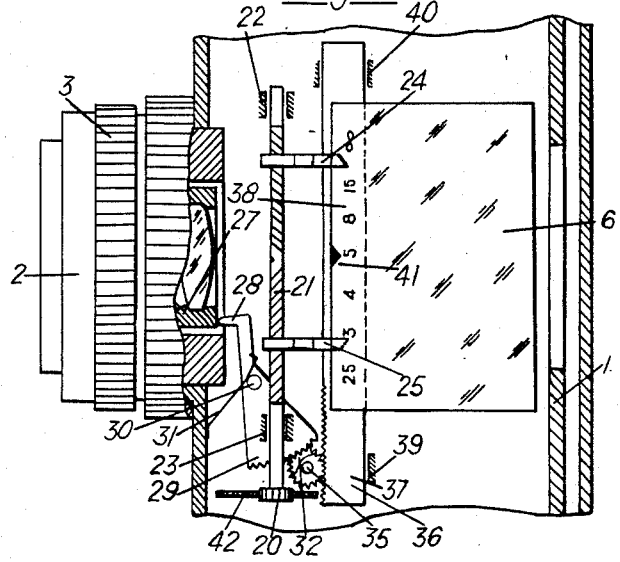
Inventor
GUNTER HEERKLOTZ
By Irwin J. Thompson
Attorney

United States Patent Office 3,174,416
Patented Mar. 23, 1965

3,174,416
MONOCULAR MIRROR REFLEX CAMERA
Gunter Heerklotz, Dresden, Germany, assignor to VEB Kamera- und Kinowerke Dresden, Dresden, Germany
Filed May 4, 1961, Ser. No. 107,808
4 Claims. (Cl. 95—44)

The invention relates to a monocular mirror reflex camera with certain-type or between-the-lens shutter with a common range and depth-of-focus indication in the viewfinder system, wherein the objective lens or the shutter installed in the objective lens possesses a diaphragm with a plunger co-operating therewith for the control of further arrangements—for example, the exposure measuring and regulating arrangement arranged on the camera side. The invention has the task of providing for this purpose an arrangement by which where an optical viewfinder system provided above the reflex mirror and preferably consisting of image field lens, roof prism and eyepiece is provided, both the distance set in each case and also the depth of focus, in dependence upon the diaphragm setting in each case, are indicated commonly in the viewfinder system.

Various arrangements for the common ascertaining and indication of the distance and depth of focus are already known in photographic cameras. Thus for example where a base range finder is provided, marks are provided in the ray path thereof which serve for the simultaneous measurement of the range and supervision of the depth of focus range and indicate the latter for the diaphragm setting in each case. In the case of a binocular mirror reflex camera reading marks situated on movable strips are provided for the indication of the distance and the depth of focus range, the movement of the strips being derived from the setting of the objective lens and diaphragm. In modification of this construction it has further been proposed to provide two pointers mounted in scissors fashion in place of the strips, which pointers are controlled through a slider coupled with the diaphragm setting arrangement or through cams and indicate the depth of focus on a ground-glass plate provided with a double footage scale. In the case of a folding camera it is also known to deflect visibly the distance entered on the mounting of the objective lens or on the baseboard, through a mirror with optical range finder, into the field of view thereof. Finally in the case of a baseboard-extensible camera it is also provided that to the optical range finder there is allocated a fixed depth-of-focus scale with a distance scale rotatable centrally thereof, which is driven by the movable objective lens carrier and is visible in common with the depth-of-focus scale, through a mirror system, in the viewfinder eyepiece.

These known arrangements however do not solve the problem upon which the invention is based. The use of a base range finder in common with a depth-of-focus indication does not provide an exact reliable control of the actual depth of focus range in the case of the arrangement of marks for the ascertaining of distance and depth of focus. Furthermore, these measuring arrangements with base range finder cannot be considered on account of the parallax here present for monocular mirror reflexes, if only for the reason that in the case of the monocular mirror reflex cameras their advantage consists especially precisely in the parallax-free viewing and photographing of the object. This advantage exists in monocular mirror reflex cameras even in comparison with the binocular mirror reflex cameras, which possess a picture-taking and a viewfinder objective lens. The arrangement proposed for this purpose for the common indication of the distance and the depth of focus range thus possesses, despite its complicated assembly, the disadvantage that it does not render parallax-free viewing possible, quite apart from the fact that the mechanism here necessary cannot be transferred to a monocular mirror reflex camera, if only for structural reasons.

The invention is based upon the problem of providing, while avoiding the stated disadvantages for monocular mirror reflex cameras, an arrangement for the common indication of the distance and the depth of focus range in dependence upon the diaphragm setting, which indication can be viewed in the parallax-free optical viewfinder system allocated to the reflex mirror.

Starting from the use of an objective lens with a control plunger co-operating with the diaphragm and a view finding arrangement associated with the ground-glass plate or picture-field lens and preferably possessing a reversing prism with eyepiece, the problem upon which the invention is based is substantially solved by the combination, that for the indication of the distance a lens system is provided, associated with the distance setting ring of the objective lens, which reproduces, by way of a mirror arranged in its ray path, distance set on the objective lens in the view finding arrangement and that for the indication of the depth of focus range a pair of pointers with a threaded spindle effecting their setting is allocated to the ground-glass plate or picture-field lens, which threaded spindle is connected with a feeler lever controlled by the diaphragm plunger of the objective lens. The threaded spindle here allocated to the picture-field lens, starting from the centre of the picture-field, is provided on one shaft length with left-hand thread and on the other shaft length with right-hand thread, a pointer thereby movable in the axial direction being allocated to each thread. The range between the two pointers produces the depth of focus range in each case, which can be received simultaneously with the distance indication in the viewfinder system. The drive of the threaded spindle can take place in accordance with the invention through a rack gear controlled by the diaphragm plunger or through a toothed wheel segment controlled directly by the diaphragm plunger.

According to a further form of embodiment a light permeable slider carrying the distance scale is allocated to the picture-field lens and is movable parallel with the depth-of-focus indication and is controlled through a gearing actuated by the objective lens in its distance setting. Thus according to this embodiment both the depth-of-focus indication and the slider with the distance scale are allocated to the picture-field lens and their setting in each case is viewable in the eyepiece. In this embodiment therefore the arrangement of an optical system for the deflection of the distance set on the objective lens into the viewfinder system can be omitted.

In the drawings, preferred examples of embodiment of the invention are illustrated diagrammatically and these are explained in the following description, whence at the same time further features of the invention appear. Here the representation of the details which do not appear absolutely necessary for the understanding of the invention has been omitted.

FIG. 3 is a part vertical sectional and fragmentary view of an embodiment of the present invention; and FIG. 4 is a fragmentary plan view of FIG. 3.

In both examples of embodiment the same reference numerals have been selected for the parts which conform as regards their construction and manner of operation.

Figure 1:
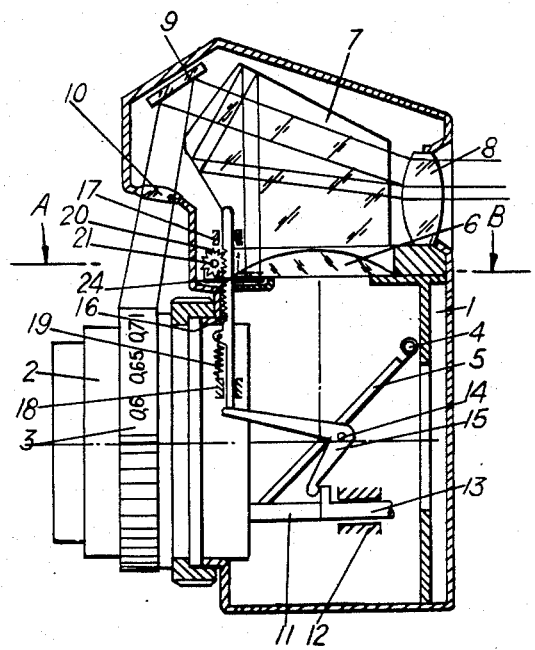
FIG. 1 is a part vertical sectional view of a monocular mirror reflex camera.
Figure 2:
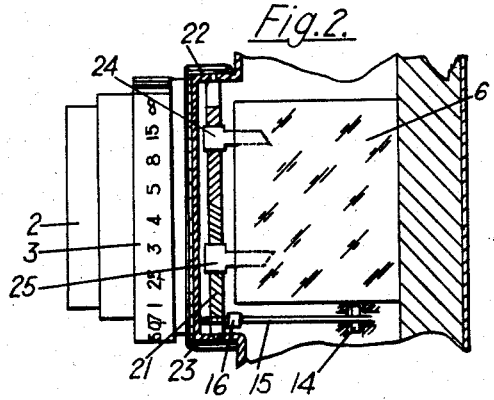
FIG. 2 is a fragmentary plan view along the lines A–B of FIG. 1.

In the example of embodiment according to FIGURES 1 and 2, in the camera housing 1 the objective lens 2 is secured in suitable fashion by means of screw or bayonet connection. The objective lens 2 possesses a setting ring 3 provided with the distance figures, by which the objective lens 2 can be set to the desired distance in known manner by means of axial movement of the lens system. The ray path coming from the objective lens 2 is deflected by a reflex mirror 5, pivotable about the spindle 4, towards an optical viewfinder system, which consists essentially of the picture-field lens 6, the roof prism 7 and the eyepiece 8. Opposite the front, bevelled surface there is allocated to the roof prism 7 a mirror 9 by which the distance set by the setting ring 3 in each case on the objective lens 2 is visibly deflected through a lens system 10 serving for the reproduction to the eyepiece 8.

The objective lens 2 possesses a diaphragm plunger 11 co-operating with the diaphragm and movable parallel with the optical axis of the objective lens 2. Against this diaphragm plunger 11 there abuts a feeler plunger 13 movably guided on the camera side in the mounting 12, which plunger controls an exposure meter and control arrangement, not illustrated in the drawing, for example in dependence upon the diaphragm setting. With the feeler plunger 13 there is engageable a bell-crank lever 15 movable about the stationary mounting 14, which with its upper arm actuates a rack 16 movable perpendicularly to the optical axis of the axis of the objective lens 2 and guided in the two mountings 17, 18. Due to the action of a traction spring 19 the rack 16 is moved downwards towards the bell-crank lever 15, so that the latter always abuts on the feeler plunger. The rack 16 engages with a toothed wheel 20 of a threaded spindle 21, which is rotatably mounted parallel with the front edge of the picture-field lens 6, on both sides in the camera walls 22, 23. The threaded spindle 21 is provided with a left-hand and right-hand threading, by which in each case a pointer 24, 25 is guided and movable in the axial direction of the threaded spindle 21 to both sides. The pointers 24, 25 move beneath the picture-field lens 6 along its plane surface.

The setting of the distance in each case, which is indicated by the distance-setting ring 3 provided on the objective lens 2 by its scale in relation to a fixed setting mark, is visibly deflected by the lens system 10 and the mirror 9 through the room prism 7 to the eyepiece 8. At the same time, in dependence upon the diaphragm setting, through the feeler plunger 13, the bell-crank lever 15, the rack 16 and the threaded spindle 21 connected therewith through the toothed wheel 20, the two pointers 24, 25, beneath the picture-field lens 6, are shifted according to the depth of focus range. As a result of this arrangement according to the invention thus through the eyepiece 8 it is possible to view commonly the distance set at the picture-taking objective lens 2, also the depth of focus range indicated by the two setting pointers 24, 25 and reproduced through the picture-field lens 6 and roof prism 7, and in addition, without parallax, by way of the viewfinder system 6, 7 through the picture-taking objective lens 2, the object to be photographed. Thus a rapid preparedness for picture-taking is ensured at the same time.

According to the example of embodiment as represented in FIGURES 3 and 4, the objective lens part 27 movable in the axial direction in the setting of the distance controls the distance indication with its rear mounting edge. Against this objective lens part 27 there abuts a toothed segment 29 by means of a feeler 28, which segment is movable on the camera side about the mounting bolt 30 and is pressed by the action of a spring 31 arranged thereon with the feeler 28 against the objective lens part 27. The toothed segment 29 engages with a toothed wheel 32 with shaft 35 guided perpendicularly in the bearings 33, 34, which shaft is connected with the toothed wheel 36. The latter engages with a light-permeable slide 37 movable parallel with the front edge of the picture-field lens 6 and carrying a distance scale 38, which slide is guided by the two mountings 39, 40. On the picture-field lens 6 a stationary setting mark 41 is adjacent to the distance scale 38. The control of the depth-of-focus indication by means of the pointers 24, 25 movable by the threaded spindle 21 takes place through a toothed segment 42, which is movable about a mounting bolt 43 fast with the housing and abuts by means of a part constructed as feeler 44 on the feeler plunger 13 due to the action of a spring 45. The toothed segment 42 engages with the toothed wheel 20 of the threaded spindle 21.

In the setting of the distance by the setting ring 3 the objective part 27 moves in the axial direction. The toothed segment 29 resting thereon by means of the feeler 28 follows this movement due to the action of the spring 31. This movement is transmitted by the toothed segment 29 through the toothed wheel gearing 32, 36 to the light-permeable slide 37, the distance scale 38 of which indicates the set distance against the fixed setting mark 41 on the picture-field lens 6. In dependence upon the diaphragm setting, through the toothed segment 42, 44, the toothed wheel 20 and the threaded spindle 21 connected therewith, the feeler plunger 13 sets the two pointers 24, 25 in relation to the distance scale 38 according to the depth of focus range produced. Thus according to this example of embodiment according to FIGURES 3 and 4 again it is possible to view through the eyepiece 8 commonly the distance set in each case, also the depth of focus range produced in dependence upon the diaphragm setting and furthermore, through the viewfinder arrangement 6–10, without parallax, the object to be photographed, through the objective lens 2.

According to the invention the arrangement for the common indication of the distance and depth of focus is so constructed that the viewfinder system serving for the viewing and consisting of reversing prism 7 and eyepiece 8 can be arranged fixedly or interchangeably in the camera 1. Here where an optical system 9, 10 allocated to the objective lens 2, for the indication of the distance, is provided, it can remain fixed on the camera 1 or can also be made interchangeable in common with the viewfinder system 7, 8. The interchangeable arrangement of the viewfinder system is shown in FIGURE 3. Here the viewfinder housing 46, in which the reversing prism 7 with eyepiece 8 is installed, is introducible over the picture-field lens 6 in direction parallel with the objective lens 2. Here the viewfinder housing 46 receives its abutment in the front wall of the camera housing 1.

The arrangement in accordance with the invention for the common indication of the distance and depth of focus in the viewfinding system is usable both in monocular mirror reflex cameras with curtain-type shutter and also in the case of monocular mirror reflex cameras with between-the-lens or central shutter installed in the objective lens. In the case of a central shutter installed in the objective lens, the presser plunger 11 provided for the control of the depth of focus preferably cooperates with the diaphragm provided in the shutter.

I claim:

1. A camera having an apertured diaphragm, diaphragm setting means, a viewer, a distance scale visible in the field of view of the viewer, a pair of indicators visible in said field of view adjacent said scale, and means for moving the image of said indicators toward or away from each other along said scale in said field of view, the last-named means comprising a spindle having a pair of screw-threaded portions of opposite hand with each of which one of said indicators is in screw-threaded engagement, and means for rotating said spindle by operation of said setting means.

2. A camera as claimed in claim 1, said means for rotating said spindle comprising a pinion carried by the spindle, a toothed rack in engagement with the pinion, and means interconnecting said diaphragm setting means and said toothed rack to move said toothed rack in opposite directions by operation of said setting means.

3. A camera as claimed in claim 2, and means mounting the rack for rectilinear reciprocatory sliding movement relative to the camera.

4. A camera as claimed in claim 2, and means mounting the rack for oscillatory reciprocatory movement about a fixed pivot on the camera.

References Cited by the Examiner
UNITED STATES PATENTS

| 2,297,634 | 9/42 | Pritschow | 95—44 |
| 2,916,981 | 12/59 | Schutz | 95—64 |
| 3,094,911 | 6/63 | Reiche | 95—42 X |

FOREIGN PATENTS 1,240,877  8/60  France.

NORTON ANSHER, Primary Examiner.
JOHN M. HORAN, Examiner.